United States Patent [19]

Donnelly, Jr. et al.

[11] Patent Number: 5,229,303
[45] Date of Patent: Jul. 20, 1993

[54] DEVICE PROCESSING INVOLVING AN OPTICAL INTERFEROMETRIC THERMOMETRY USING THE CHANGE IN REFRACTIVE INDEX TO MEASURE SEMICONDUCTOR WAFER TEMPERATURE

[75] Inventors: Vincent M. Donnelly, Jr., Berkeley Heights; James A. McCaulley, Clinton, both of N.J.

[73] Assignee: AT&T Bell Laboratories, Murray Hill, N.J.

[21] Appl. No.: 808,949

[22] Filed: Dec. 13, 1991

Related U.S. Application Data

[63] Continuation of Ser. No. 400,215, Aug. 29, 1989, abandoned.

[51] Int. Cl.$^5$ .................... H01L 21/00; H01L 21/02; H01L 21/30; H01L 21/306
[52] U.S. Cl. .................................. 437/7; 437/8; 156/626; 204/192.13; 204/192.33
[58] Field of Search ............... 437/7, 8; 204/192.13, 204/192.33; 156/626, 627

[56] References Cited

U.S. PATENT DOCUMENTS

| | | | |
|---|---|---|---|
| 3,988,564 | 10/1976 | Garvin et al. | 437/228 |
| 4,408,884 | 10/1983 | Kleinknecht et al. | 437/7 |
| 4,437,761 | 3/1984 | Kroger et al. | 356/44 |
| 4,495,221 | 1/1985 | Broadbent | 437/7 |
| 4,496,448 | 1/1985 | Tai et al. | 156/643 |
| 4,717,446 | 1/1988 | Nagy et al. | 156/626 |

FOREIGN PATENT DOCUMENTS

| | | | |
|---|---|---|---|
| 0026569 | 11/1978 | Japan | 437/7 |
| 0145836 | 6/1989 | Japan | . |
| 0296686 | 11/1989 | Japan | . |

OTHER PUBLICATIONS

Saenger, Wavelength-modulated interferometric thermometry for improved substrate temperature measurement, Rev. Sci. Instrum., vol. 63, No. 8, Aug. 1992, pp. 3862-3868.
Donnelly, Infrared-laser interferometric thermometry: a nonintrusive technique for measuring semiconductor wafer temperatures, J. Vac. Sci. Technol A, vol. 8, No. 1, Jan. 1990, pp. 84-92.
Bond, Temperature measurements of glass substrates during plasma etching, J. Vac. Sci. Technol., 18(2), Mar. 1981, pp. 335-338.
*Journal of Crystal Growth,* 55 (1981).
Chemical Vapor Deposition for Microelectronics by A. Sherman, Noyes Data Corporation, Parkridge, N.J., 1987.
M. Born and E. Wolf in *Principle of Optics* (Pergamon Press, N.Y., 1980).
D. Hacman in *Optik,* 28, 115 (1968).
Chang and Ploog, *Molecular Beam Epitaxy and Heterostructures,* Martinus Nijhoff Publishers, Dordrecht, 1985.
F. Stern in *Phys. Rev.* A, 133, 1653 (1964).
Y. S. Touloukian, et al., *Thermophysical Properties of Matter,* 13, "Thermal Expansion", Plenum Press, N.Y., 1977.

*Primary Examiner*—Brian E. Hearn
*Assistant Examiner*—B. Everhart
*Attorney, Agent, or Firm*—Bruce S. Schneider

[57] ABSTRACT

A method for fabricating a semiconductor device, which involves a technique for monitoring the temperature of the semiconductor substrate in which the device is formed, is disclosed. In accordance with the inventive technique, light, to which the substrate is substantially transparent, is impinged upon the substrate, and the intensity of either the reflected or transmitted light is monitored. If, for example, the intensity of the reflected light is monitored, then this intensity will be due to an interference between the light reflected from the upper surface of the semiconductor substrate and the light transmitted through the substrate and reflected upwardly from the lower surface of the substrate. If the temperature of the substrate varies, then the optical path length of the light within the substrate will vary, resulting in a change in the detected intensity. By comparing the detected intensity with intensities corresponding to known temperature variations, the temperature of the substrate is readily determined.

9 Claims, No Drawings

DEVICE PROCESSING INVOLVING AN OPTICAL INTERFEROMETRIC THERMOMETRY USING THE CHANGE IN REFRACTIVE INDEX TO MEASURE SEMICONDUCTOR WAFER TEMPERATURE

This application is a continuation of application Ser. No. 07/400,215, filed on Aug. 29, 1989, now abandoned.

BACKGROUND OF THE INVENTION

1. Field of the Invention

This invention relates to the fabrication of devices and, in particular, to the fabrication of devices by thermal processes.

2. Art Background

Various methods have been devised for measuring the temperature of an article. Approaches generally rely on either optical or electrical measurements with or without a thermal probe. Generally electrical measurement techniques use a probe such as a thermocouple where the electrical characteristics of a bimetal contact in proximity to the article is indicative of article temperature.

It is possible to perform optical measurements with a probe or directly on the article without a probe. Exemplary of optical probes is a silica optical fiber including a terminal region of silicon. (See U.S. Pat. No. 4,437,761 dated Mar. 20, 1984). The refractive index of the silicon region varies strongly with temperature and thus light traversing the optical fiber and incident on the silicon region is reflected both at the interface of the silicon region with the silica fiber and at the interface of the silicon region with the ambient. The resulting interference pattern between the two portions of reflected light, due to the strong temperature dependence of the refractive index in silicon, and to a significantly lesser extent to thermal expansion, allows a measure of temperature. However, it must be assumed that the electrical or optical probe and the article are at the same temperature. Even when the probe contacts the article to be measured, such assumptions are often at best approximate.

As discussed, direct measurement techniques not requiring the assumption of temperature equivalence between probe and article are also available. Exemplary of these techniques is a process described by D. Hacman in *Optik*, 28, 115 (1968). In this technique, the temperature of a quartz substrate is monitored by directing visible light onto the surface of the substrate. Likewise, R. A. Bond, et al. in *Journal of Vacuum Science and Technology*, 18, (2), 335 (1981) have used this technique to measure the temperature of a quartz substrate in a plasma reactor. As in the previously described optical fiber technique, interference occurs due to reflection at both the incident surface of the glass and at the remote substrate surface. Since the coefficient of linear expansion of the substrate is temperature dependent, a monitoring of the interference pattern gives a measure of the change in substrate thickness and thus the associated temperature change. Similarly, pyrometric techniques are also available which do not depend upon an assumed equivalence between article and probe temperatures. In these measurements, black body radiation characteristic of temperature is emitted by the article and is detected.

The quality of devices such as optical devices, electronic devices and optoelectronic devices depends, to a large extent, on the control of processes employed in their fabrication. A significant processing condition in most such procedures is the temperature. For example, in deposition techniques where a heated substrate is subjected to gases that undergo thermally induced chemical reactions to produce deposition on the substrate, the substrate temperature significantly affects the composition of the resulting deposit. Exemplary of such deposition techniques are molecular beam epitaxy (MBE), chemical vapor deposition (CVD) and metal organic chemical vapor deposition (MOCVD). (A description of these processes can be found in Chang and Ploog, *Molecular Beam Epitaxy and Heterostructures*, Martinus Nijhoff Publishers, Dordrecht, 1985, *Journal of Crystal Growth*, 55 (1981) and *Chemical Vapor Deposition for Microelectronics* by A. Sherman, Noyes Data Corporation, Parkridge, N.J., 1987. In general, these techniques all depend on the interaction of gas phase entities with a heated substrate to produce deposition.) Similarly, etching processes such as plasma etching and reactive ion etching (RIE) also depend on substrate temperature. For example, if the temperature across a wafer varies significantly, the etch rate across the substrate also differs. Clearly, a spatial variation in etch rate across a substrate will produce undesirable nonuniformities during fabrication.

Presently, for processes such as MBE, MOCVD, and CVD the more accurate the substrate temperature measurement the better the control of the process. Techniques such as plasma etching and reactive ion etching (RIE) can be advantageously controlled presently without temperature monitoring. However, as device structures become smaller, the effects of temperature are expected to produce unacceptable nonuniformities even in these etching techniques. Therefore, precise temperature monitoring is quite significant.

As a result, techniques relying on the weak assumption of temperature equilibration between the substrate and temperature probe are not desirable. Techniques such as optical pyrometry also involve significant inaccuracies. Optical pyrometry depends on the measure of absolute intensity of light emitted by a substrate. This absolute intensity is strongly affected by properties such as transmittance of optical windows in the fabrication chamber and emissivity of the substrate itself. Since it is generally expected that these parameters will significantly change during processing, i.e. unavoidable contamination will be expected to change window transmission and substrate surface change will be expected to effect substrate emissivity, the measure of absolute intensity is inaccurate at best.

Techniques involving the monitoring of changes in the linear coefficient of expansion with temperature, although initially suggested for monitoring of device processing, have not been pursued. This lack of activity has possibly occurred due to inaccuracies inherent in the relatively small change of expansion coefficient with temperature. Irrespective of the reasons, a satisfactory technique for temperature monitoring associated with device processing is not presently available.

SUMMARY OF THE INVENTION

The invention involves a technique for directly measuring the temperature variation of a semiconductor substrate, such as a silicon wafer, during one or more temperature-sensitive processing steps leading to the fabrication of a semiconductor device. Significantly, the inventive technique avoids the need to achieve good thermal contact to the substrate, as is the case when using thermocouples, and also avoids the need for frequent calibrations, as is the case with conventional pyrometry.

In accordance with the inventive technique, the upper and lower surfaces of the substrate are made reflective, and light, to which the substrate is substantially transparent, is impinged on one of the surfaces, e.g., the upper surface. Then, the intensity of either reflected or transmitted light is monitored as a function of time, and thus of temperature, passing at some point through a known temperature. For monitoring reflected light a portion of the incident light is reflected from the upper surface, and another portion is transmitted, i.e., refracted, through the semiconductor substrate. Upon impinging on the lower surface, part of the refracted portion is reflected upwardly through the semiconductor substrate, exiting the substrate to interfere with the light which was reflected from the upper surface. For monitoring transmitted light, at least a portion of the incident light is transmitted through the thickness of the semiconductor substrate. At the lower surface, some of this light is transmitted and some is reflected to the upper surface, where it is again reflected downwardly to interfere with the transmitted light. In either case, as the temperature of the substrate varies during processing, the optical path length of the light within the substrate will vary, resulting in differing degrees of constructive and destructive interferences. As a consequence, the intensity of the detected light will vary as a function of temperature, and thus of time. By comparing this intensity variation, called an interferogram, with a calibrated interferogram, the temperature of the substrate is readily determined. The device fabrication process is controlled based on the determined temperature.

It should be noted that in the case of semiconductors, variations in temperature have a much larger effect on the thermal refractive index coefficients that on the corresponding thermal expansion coefficients. As a consequence, it is the variations in the refractive index (with temperature) which largely determine the variations in optical path length of the light within the semiconductor substrate.

DETAILED DESCRIPTION

As discussed, the invention involves a process for fabricating a semiconductor device including at least one processing step which depends on temperature and where this temperature is monitored to control the process by measuring the optical path length of the semiconductor material.

The procedure is generally applicable to fabrication processes involving semiconductor materials, i.e., materials having a bandgap less than 1.9 electron volts such as Si, Ge, InP, GaP, CdTe, InSb and GaAs. Generally such materials have a strong temperature dependency, i.e. greater than 50% of the change in optical path length with temperature being due to change in refractive index. Exemplary processing steps include etching and various types of deposition procedures such as MBE, MOCVD, and CVD.

The temperature measuring procedure involves illumination of the semiconductor material from a light source capable of creating interference (e.g., laser light) and measurement of the reflected or transmitted optical intensity. The light being used is generally in the wavelength range 600 to 10,000 nm and should be chosen so that no more than 90% of the incident light is absorbed in the substrate. The substrate being processed should have essentially parallel surfaces (i.e. should, over any region of 10 $\mu$m dimension in the monitored area, have thickness variation of less than the wavelength of light being used for monitoring) and the opposing surface should be sufficiently reflective (typically at least 3% reflective) to produce a signal of sufficient intensity to be detected. Generally the power of the incident light should be greater than $10^{-6}$ W to produce a detectable signal. Additionally, power densities greater than those producing a 2° C. temperature rise should be avoided. This power density is, for example, approximately $10^5 W/cm^2$ in a 0.1 mm diameter spot at a wavelength where 90% of the light is absorbed in a single pass through the substrate. Typically, for surfaces of at least 3% reflectivity observed intensities of about $10^{-6}$ W in transmission and of about $10^{-8}$ W in reflection are obtained. The intensity of the reflected or transmitted light beam is monitored with, for example, photodiodes, photomultipliers, or charge-coupled devices. The intensity variation data is compared with: either 1) that expected from the temperature change in optical path length expected theoretically as determined in accordance with calculations for the intensity of reflected or transmitted light as described by M. Born and E. Wolf in *Principle of Optics* (Pergamon Press, New York, 1980) combined with calculations for refractive index dependency on temperature as described by F. Stern in Phys. Rev. A, 133, 1653 (1964) and thermal expansion dependency on temperature as described by Y. S. Touloukian, et al, *Thermophysical Properties of Matter*, 13, "Thermal Expansion", Plenum Press, New York, 1977; or 2) that obtained from calibration measurement. The calibration measurements are typically made by mounting a small substrate and a thermocouple in an isothermal enclosure and slowly heating the enclosure while simultaneously monitoring transmitted light and thermocouple temperature, thereby acquiring a calibrated interferogram.

In a specific embodiment of the invention, a semiconductor wafer (substrate) being processed, such as a 0.5 mm thick silicon wafer, has a pair of polished essentially parallel surfaces. (Typical wafers have a taper angle generally between 0.01° and 0.1° over a 1 mm diameter area to be probed by the incident light.) The light source, e.g. laser, such as a 1.5 micron indium gallium arsenide phosphide laser or a helium-neon laser emitting a wavelength of about 1.15 microns or 1.52 microns, is selected such that its output radiation has a wavelength for which the above mentioned surface reflectivity is attained.

During device fabrication, a semiconductor substrate is subjected to a number of processing steps (as previously discussed), such as material formation, doping with impurities and etching. The invention involves a procedure where, at least one of these processing steps is dependent on the temperature of the wafer. This temperature dependent step is typically performed in a closed container, at least a portion of whose surface has a transmissivity of at least 3% to the monitoring radiation. While the wafer is being processed in accordance with the aforementioned temperature dependent step, radiation from the laser is directed through the transparent portion of the container onto the wafer and the radiation reflected by or transmitted through the wafer is observed through the transparent portion of the surface of the container—as in an interferometric measurement configuration.

In accordance with known principles of optics, an interference intensity is observed. (If the substrate region being monitored has a taper typically greater than $10^{-3}$ degrees per cm of beam diameter then a series of spatial fringes relative to the difference in optical path length will be observed.) As the temperature varies the intensity varies. If a spatial fringe pattern is present across the transmitted or reflected beam, this pattern of fringes traverses the beam profile in a direction normal to the direction of propagation of the reflected light. For the case of a substrate tapered such that the thinner end is toward the right, observation of the direction of motion of the fringes (if present)—from left to right versus right to left—is used to determine whether the temperature of the substrate is increasing versus decreasing. To determine the absolute temperature change, in the situation with no fringes the calibration data is employed together with determination of temperature change reversal through observation of anomalously low intensity maximum or anomalously high intensity minimum as temperature varies.

In an exemplary calibration procedure, the test wafer is placed in a boron nitride cavity which is subjected to various temperature changes (measured by a thermocouple or platinum resistance thermometer) and irradiated with laser radiation. The laser radiation (typically impacting the wafer at an angle to the wafer of greater than 10° with respect to the wafer surface) after reflection by or transmission through the wafer is observed through a hole in the cavity. In this way, a calibration standard for the temperature of the wafer being processed is established. Advantageously, the temperature range over which the test wafer is subjected, includes the same temperature range as that which the wafer to be processed is subjected.

We claim:

1. Method of manufacturing a semiconductor device, the method comprising
   a) providing a semiconductor body having a first and a second major surface,
   b) carrying out one or more processing steps on the body, at least one of the steps depending on the temperature of the body;
   characterized in that the method further comprises
   c) exposing the body to electromagnetic radiation and detecting radiation reflected from, or transmitted through, the body wherein said radiation undergoes interference;
   d) monitoring the intensity variation with time through an extremum of the detected radiation as the temperature of the body changes during one of said processing steps to determine a value representative of said temperature based at least in part on the change of refractive index of said body with said temperature, the processing step to be carried out at a nominal processing temperature $T_p$; and
   e) controlling at least one of said processing steps in accordance with the result of step d).

2. Method of claim 1, wherein the method comprises comparing the intensity of the detected radiation with a known calibration target intensity associated with the temperature $T_p$.

3. Method of claim 1, wherein both major surfaces of the body are relatively smooth such that each surface specularly reflects at least 3% of said radiation that is incident thereon.

4. Method of claim 1, wherein the semiconductor body is a semiconductor wafer, and wherein the semiconductor comprises a material selected from the group consisting of Si, Ge, GaAs, InP, GaP, CdTe and InSb.

5. Method of claim 1, wherein said radiation is in the wavelength range 600 to 10,000 nm, and wherein the radiation is laser radiation.

6. Method of claim 1, wherein the intensity of the detected radiation is a function of the optical path length of the detected radiation in the semiconductor body, the optical path length being a function of the temperature of the body, with greater than 50% of the change of optical path length with temperature being due to a change of the refractive index of the body with temperature.

7. Method of claim 1, wherein a portion of the first major surface is exposed to the radiation, the portion being substantially but not exactly parallel to the second major surface, such that a plurality of spatial interference fringes are formed, a change in the temperature of the body resulting in a movement of the fringes; wherein the method comprises sensing the direction of movement of the fringes, whereby the sense of the temperature change can be determined.

8. Method of claim 1, wherein the semiconductor body comprises a relatively thick first semiconductor substrate and at least one relatively thin second semiconductor layer, the second layer differing in composition and/or doping level from the first layer, step b) including changing the thickness of the second layer, wherein a property of said layer depends on the temperature of the body.

9. Method of claim 1, wherein said radiation is laser radiation.

* * * * *